Feb. 5, 1929.  
E. MACH  
1,701,210  
COMBINATION BUMPER, SPARE TIRE CARRIER, AND TRUNK RACK  
Filed June 20, 1928  3 Sheets-Sheet 3
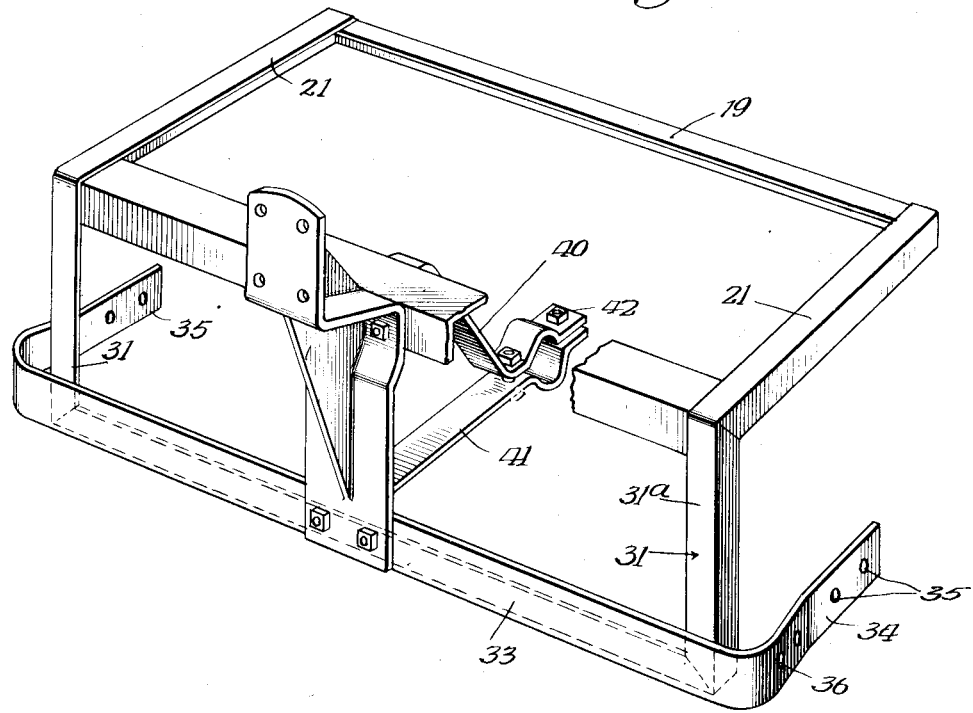
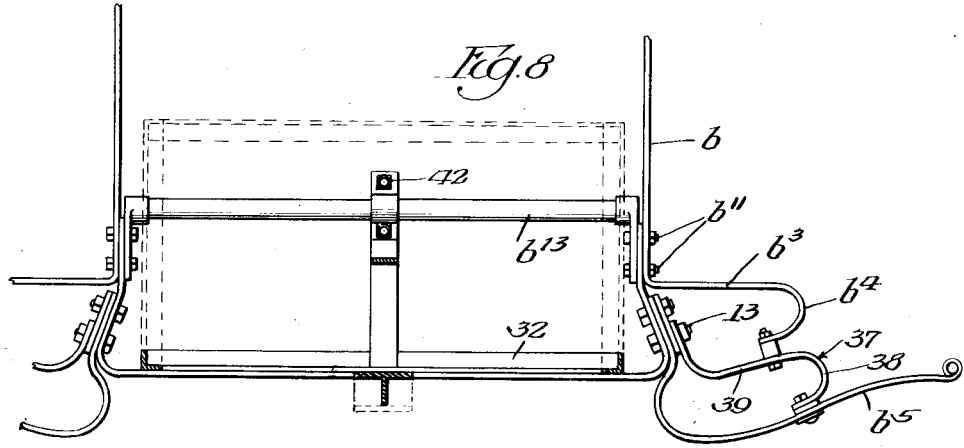
Inventor:  
Edward Mach  
By Ford Gerlach Atty.

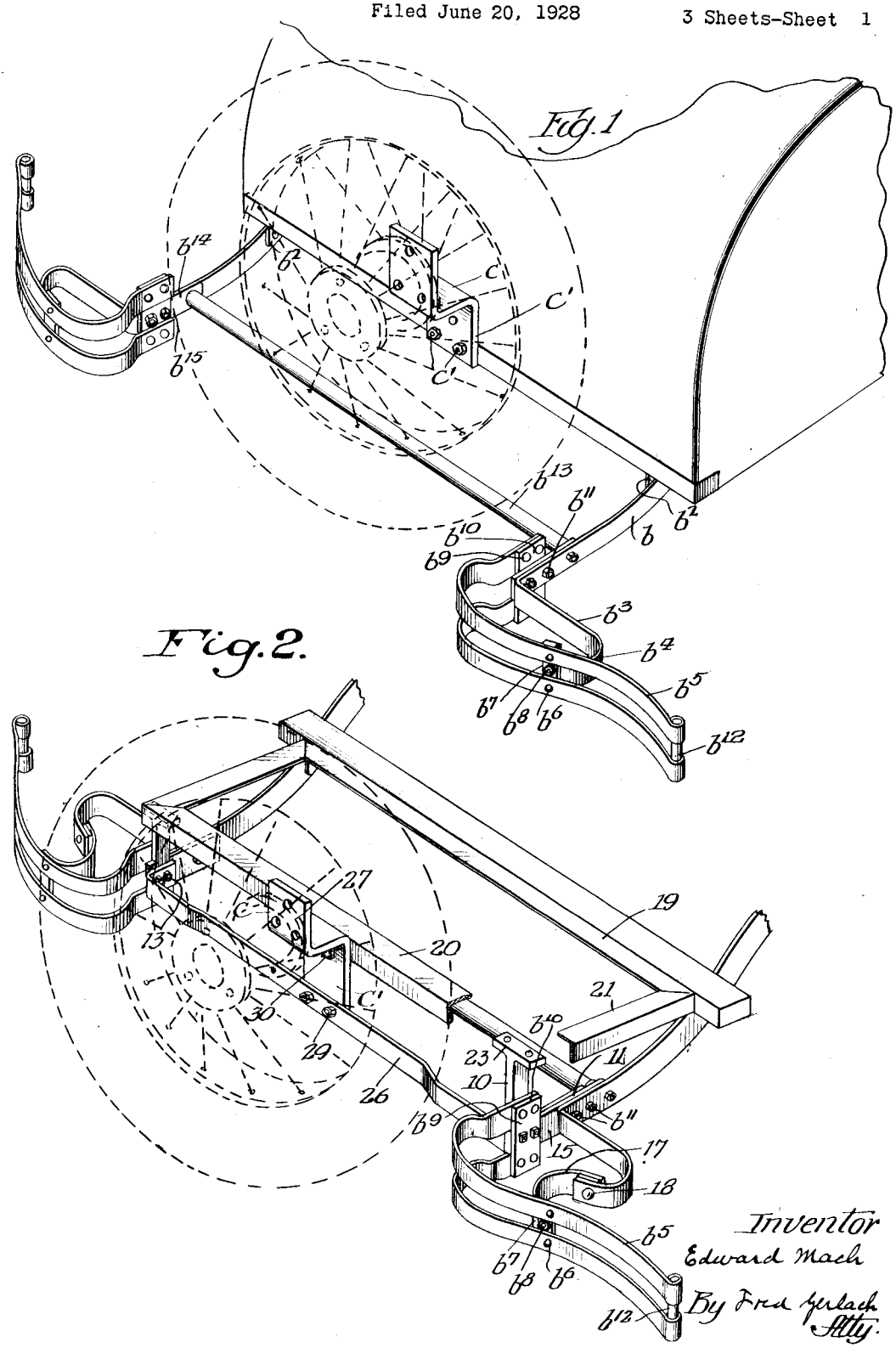

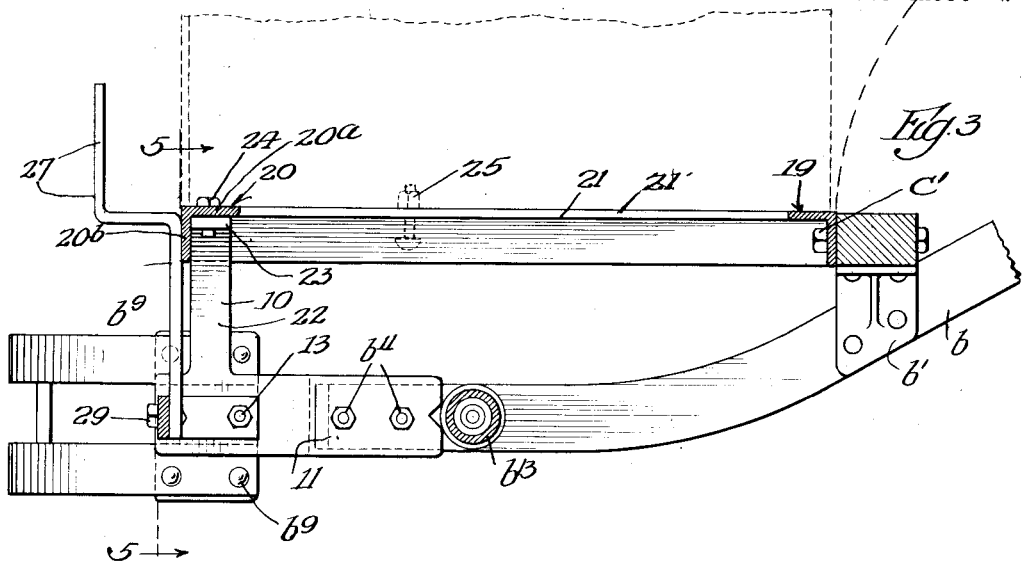
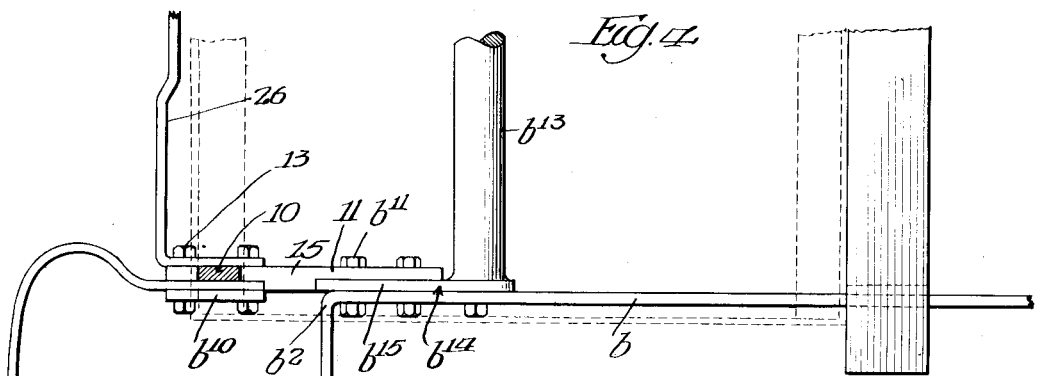
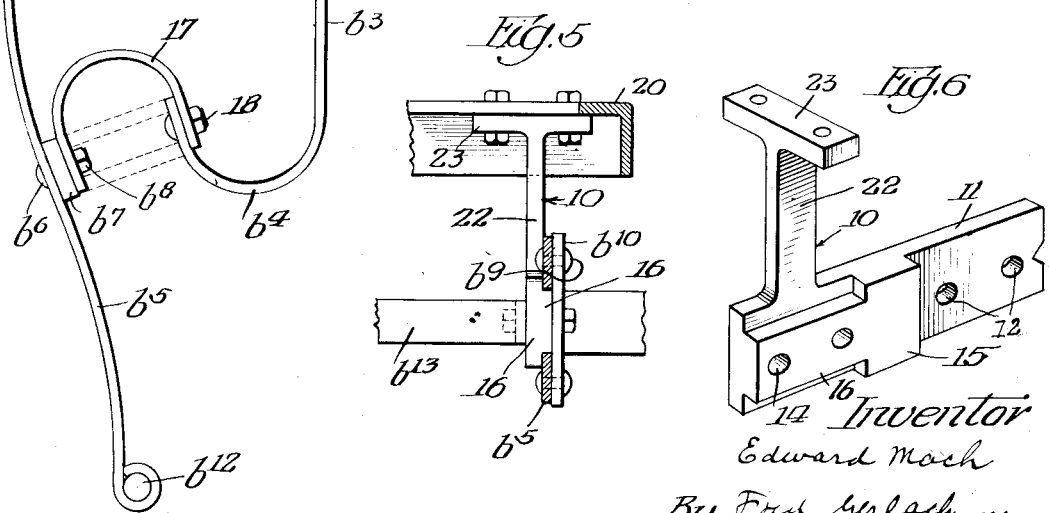

Patented Feb. 5, 1929.

1,701,210

UNITED STATES PATENT OFFICE.

EDWARD MACH, OF CHICAGO, ILLINOIS, ASSIGNOR, BY MESNE ASSIGNMENTS, OF ONE-HALF TO SEARLES ELECTRIC WELDING WORKS, OF CHICAGO, ILLINOIS, A CORPORATION OF ILLINOIS.

COMBINATION BUMPER, SPARE-TIRE CARRIER, AND TRUNK RACK.

Application filed June 20, 1928. Serial No. 286,726.

The invention relates to a combination bumper, spare tire carrier and trunk rack for an automobile.

One object of the present invention is to provide an apparatus which is in the nature of an attachment and is operative, when the parts thereof are properly applied, to adapt the bumper of a Ford automobile for carrying a trunk or similar luggage containing receptacle.

Another object of the invention is to provide an apparatus or attachment of the aforementioned character in which the parts are so constructed and arranged that they tend to reinforce and strengthen the bumper elements of the automobile with which the apparatus is associated.

A further object of the invention is the provision of an apparatus for adapting a bumper to support a trunk, in which the parts thereof may be assembled readily and quickly in their operative positions.

A still further object of the invention is to provide a combination bumper, spare tire carrier and trunk rack which is of new and improved construction and is efficient in operation.

Other objects will be apparent from a consideration of the detailed description hereinafter.

The invention consists in the several novel features hereinafter set forth and more particularly defined by the claims at the conclusion hereof.

In the drawings which accompany and form a part of this specification or disclosure and in which like numerals and characters of reference denote corresponding parts throughout the several views:

Figure 1 is a perspective view of the rear end of a Ford automobile showing the arrangement and construction of the bumper and the spare tire carrier;

Figure 2 is a perspective view similar to Figure 1, showing an attachment embodying the invention in its operative position and applied to the bumper so as to adapt the latter for carrying a trunk;

Figure 3 is a vertical longitudinal sectional view of the combination bumper, spare tire carrier and trunk rack shown in Figure 2;

Figure 4 is a fragmentary plan view, parts being omitted and parts being shown in section for illustrative purposes;

Figure 5 is a detailed section taken on the line 5—5 of Figure 3, showing one of the brackets for supporting the trunk rack;

Figure 6 is a perspective view of the bracket shown in Figure 5;

Figure 7 is a perspective of a trunk rack embodying a modified form of the invention; and Figure 8 is a horizontal sectional view of the apparatus or form of the invention disclosed in Figure 7.

The apparatus or attachment which forms the subject matter of the present invention is adapted primarily for use in connection with the bumper of a Ford automobile. This bumper as shown in Figure 1 of the drawings, comprises a pair of longitudinally extending strap-iron bars $b$ which are spaced apart and are disposed adjacent the sides of the chassis. The front ends of these bars $b$ extend upwardly and then forwardly and are connected to the side members of the chassis by brackets (not shown). The central portions of the bars $b$ are supported by brackets $b^2$ which are secured to the end member of said chassis. The rear ends of the bars are bent at right angles to form portions $b^3$ which extend outwardly or laterally with respect to the chassis or body of the automobile. The outer ends of these laterally extending portions are bent rearwardly and inwardly to form C-shaped members $b^4$ which operate as cushioning means or spring supporting members for a pair of bumper units. The latter are disposed at the sides of the spare tire and directly behind the fenders or mud-guards for the rear wheels. Each of these bumper units consists of a pair of strap-iron bars $b^5$ which are positioned one above the other in spaced relation and have their outer ends projecting laterally to protect the adjacent fender. The two bars $b^5$ are riveted as at $b^6$ to the ends of a vertically extending connecting member $b^7$. The central part of this connecting member is secured to the distal end of the contiguous C-shaped member $b^4$ by bolts $b^8$. The inner ends of the bars $b^5$ are bowed or curved so as to extend forwardly and are connected by rivets or bolts $b^9$ to the ends of a vertically extending attaching plate $b^{10}$. The latter is connected by a pair of bolts $b^{11}$ to the portion of the bar $b$ that is disposed inwardly of the right angle bend. The outer ends of said bars $b^5$ are bent into cylindrical form and are cross-connected by a sleeve bearing element or bolt $b^{12}$. A cross-rod $b^{13}$ extends between the longitudinal bars $b$ and is secured to the latter by means of a pair of brackets $b^{14}$. These brackets are provided with extensions $b^{15}$ which extend rearwardly and are clamped between the bars $b$ and the central portions of the attaching plates $b^{10}$ by the bolts $b^{11}$. The spare tire for the automobile is disposed directly behind the cross-rod $b^{13}$ and is carried in this position and between the bumper units by a bracket or carrier $c$ which is secured to the rear end of the body by a pair of bolts $c^1$.

In the form of the invention disclosed and illustrated in Figures 2 to 6, the apparatus or attachment for adapting the bumper to carry a trunk or similar luggage containing receptacle comprises a pair of brackets 10 which are operative to space the bumper units rearwardly of the bars $b$ so that there is sufficient room or space for carrying the trunk. Each bracket 10 comprises an elongated longitudinally extending member 11, the front end of which is adapted to be secured against the inner face of the extension $b^{15}$ of the bracket $b^{14}$ after the attaching plate $b^{10}$ has been disconnected. Said front end of the member 11 is provided with a pair of holes 12 through which the bolts $b^{11}$ are adapted to extend to support the bracket in its operative position. The rear end of the member 11 projects rearwardly of the right angle bend in the bar $b$ and is adapted to support the attaching plate $b^{10}$, as shown in Figures 2, 3 and 4. A characteristic of supporting the attaching plate $b^{10}$ rearwardly of the bar $b$ is that the bumper unit with which the bracket is associated is disposed a sufficient distance rearwardly to permit the trunk to be positioned in the rear of the automobile. The attaching plate $b^{10}$ is secured to the outer face of the member 11 by a pair of bolts 13 which extend through the central portion of said plate and a pair of holes 14 formed in the rear end of said member 11. A vertically extending pad or lug 15 is formed integrally with the central portion of the member 11. This pad extends between and abuts against the rear end of the extension $b^{15}$ and the front side edge of the attaching plate $b^{10}$. A horizontally extending pad or lug 16 is formed integrally with the rear end of the member 11 and fits against the inner face of said attaching plate $b^{10}$ and between the inner ends of the bumper-bars $b^5$. This last mentioned pad operates in connection with the attaching plate $b^{10}$ to space the bars $b^5$ apart. The pads 15 and 16 exemplify means for reinforcing the brackets 10 and for generally strengthening the bumper elements.

Strap-iron spacer members or pieces 17 are provided for holding the outer ends of the bumper units in spaced relation with respect to the C-shaped members $b^4$. These pieces are connected to the distal ends of the portions $b^4$ by studs or rivets 18 and are arranged oppositely to said portions $b^4$ so as to form with the latter S-shaped cushioning members for the bumper units. The rear ends of the pieces 17 are connected by the bolts $b^8$ to the central portions of the connecting members $b^7$ after the latter have been disconnected from the C-shaped portions $b^4$ of the bars $b$. A characteristic of utilizing spacer pieces of the character disclosed is that the resiliency or shock absorbing quality of the bumper units is increased.

The trunk is supported upon a rectangular angle iron rack or frame comprising a front bar 19, a back bar 20 and side bars 21. This rack is held in a horizontal position above the rear ends of the bars $b$ and the front end thereof is supported from and connected to the rear end of the automobile by the bolts $c^1$ after the spare tire carrier $c$ has been removed. The rear end of the trunk rack is supported upon a pair of standards 22 which are integral parts of the brackets 10. The upper ends of these standards 22 are provided with integral cross-members 23 which underlie the horizontal flange or leg $20^a$ of the back bar 20. Bolts 24 extend through said leg and the cross-members 23 to hold the parts in rigid relation. The trunk is adapted to be positioned upon the rack and is preferably held in place by means of bolts 25 which are connected to the horizontal legs $21^a$ of the side bars 21.

A cross bar 26 is provided for reinforcing and cross-bracing the bars $b$ and the bumper units. The ends of this cross-bar 26 are bent forwardly and are secured to the rear ends of the members 11 by the bolts 13.

The attachment also comprises a bracket or carrier 27 for supporting the spare tire of the automobile at the rear of the trunk. This bracket is in the form of a plate which is secured at its lower end by bolts 29 to the central portion of the cross-bar 26. The upper end of the carrier-plate is bent rearwardly and then upwardly to form a support for the hub of the wheel with which the spare tire is associated. Bolts or other similar securing means are adapted to extend through the top part of the carrier and are operative to secure the hub of the spare wheel in its proper position. The central portion of the carrier-plate is secured to the vertical flange or leg $20^b$ of the back bar 20 by bolts 30. The carrier 27 exemplifies means for supporting the spare wheel and tire from and rearwardly of the trunk rack.

In the form of the invention illustrated in Figures 7 and 8 the side bars 21 of the trunk-rack are extended rearwardly and bent downwardly to form legs 31 which take the place of the standards 22 of the brackets 10. The lower ends of these legs are cross connected by an angle iron bar 32, which is preferably formed as an integral part thereof. To the transverse flanges 31ª of the legs 31, a strap iron member 33 is welded or otherwise secured. This member is in the nature of a cross bar and functions similarly to the cross bar 26 (Figures 2 to 6). The ends of the bar 33 are bent forwardly as shown in Figure 7 to form plates 34 which are in lieu of the brackets 11. These plates operate to hold the bumper units in spaced relation relatively to the rear ends of the bars $b$. The front ends of the plates 34 are each provided with a pair of holes 35 through which the bolts $b^{11}$ extend. A pair of holes 36 are formed in the rear ends of said plates 34 and the bolts 13 extend therethrough. The spacer-members between the outer ends of the bumper units and the C-shaped members $b^4$ consist of strap-iron pieces 37 comprising C-shaped parts 38 which are disposed rearwardly of the members $b^4$ and extend in the same direction and transverse extensions 39 which have their inner ends bent forwardly and secured to the rear ends of the plates 34 by the bolts 13. The front ends of the C-shaped parts 38 are secured to the rear ends of the members $b^4$ by the bolts 18 and the rear ends thereof are fastened in place by the bolts $b^8$. To additionally support the trunk rack a pair of brace members 40 and 41 are provided. The front ends of the members are recessed to fit around the cross-rod $b^{13}$ and are clamped thereto by a bolt 42. The rear end of the member 40 extends upwardly and is secured to the horizontal flange on the back bar of the rack. The rear end of the member 41 is connected to the angle iron bar 32.

The apparatus or attachment herein disclosed may be applied readily in its operative position and serves to adapt the bumper of a Ford automobile for carrying luggage or a trunk at the rear end thereof. The attachment is not only simple in that it embodies only a small number of parts but operates to reinforce effectively the bumper parts.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An attachment device for an automobile rear bumper that embodies a pair of lateral bumper units and a pair of longitudinal bars, said device comprising a pair of plate-members adapted to be secured to the rear ends of the bars and to support the bumper units rearwardly of and in spaced relation relatively thereto, a trunk-rack adapted to be positioned so that the rear end thereof overhangs said plate-members, and means depending from the rear end of said trunk-rack for supporting the rack in said position.

2. An attachment device for an automobile rear bumper that embodies a pair of lateral bumper units and a pair of longitudinal bars, said device comprising a pair of plate-members adapted to be secured to the rear ends of the bars and to support the bumper units rearwardly of and in spaced relation relatively thereto, a trunk-rack adapted to be positioned so that the rear end thereof overhangs said plate-members, a pair of vertically extending leg-members having their upper ends secured to the rack and their lower ends connected adjacent the rear ends of said plate-members, said leg-members being operative to support the rack in the aforementioned position.

3. An attachment device for an automobile rear bumper that embodies a pair of lateral bumper units and a pair of longitudinal bars having the rear ends thereof bent outwardly, said device comprising a pair of plate-members adapted to be secured to the rear ends of the longitudinal parts of said bars and to support the bumper units in the rear of and in spaced relation relatively thereto, a trunk-rack adapted to be positioned so that its rear end overhangs said plate-members, means for supporting the rack in said position, and spacer members adapted to extend between and be secured to the bumper units and the outwardly extending ends of the bars.

4. An attachment device for an automobile rear bumper that embodies a pair of lateral bumper units and a pair of longitudinal bars having the rear ends thereof bent outwardly, said device comprising a pair of plate-members adapted to be secured to the rear ends of the longitudinal parts of said bars and to support the bumper units in the rear of and in spaced relation relatively thereto, a trunk-rack adapted to be positioned so that its rear end overhangs said plate-members, means for supporting the rack in said position, and resilient C-shaped spacer members adapted to extend between and be secured to the bumper units and the outwardly extending ends of the bars.

5. An attachment device for an automobile rear bumper that embodies a pair of lateral bumper units and a pair of longitudinal bars, said device comprising a pair of plate-members adapted to be secured to the rear ends of the bars and to support the bumper units in the rear of and in spaced relation relatively thereto, a cross-bar adapted to extend between the rear ends of said plate-members, a trunk-rack adapted to be positioned so that the rear end thereof overhangs the plate-members and provided with depending means for supporting it in said position, and a carrier for a spare tire secured to said cross-bar and rack.

6. A combination carrier device for an automobile, comprising two parallel bars adapted to extend rearwardly from the frame of the automobile, a pair of laterally extending bumper units positioned rearwardly of and supported by the rear ends of said bars, a horizontal trunk-rack positioned above the rear ends of said bars, said rack being provided at the front end thereof with means for attachment to the body of the automobile, and means for supporting the rear end of the rack.

7. A combination carrier device for an automobile, comprising two parallel bars adapted to extend rearwardly from the frame of the automobile, a pair of laterally extending bumper units positioned rearwardly of and supported by the rear ends of said bars, a horizontal trunk-rack positioned above the rear ends of said bars, said rack being provided at the front end thereof with bolts for attachment to the body of the automobile and vertical extending leg-members depending from the rear end of said rack.

8. A combination carrier device for an automobile, comprising two parallel bars adapted to extend rearwardly from the frame of the automobile, a pair of bumper units, each of said units consisting of an attaching plate and a pair of impact members projecting laterally therefrom, plate-members extending between and secured to the attaching plates and the rear ends of the bars, said plate-members being operative to space the bumper units rearwardly of said bars, a trunk-rack adapted to be positioned so that the rear end thereof overhangs said plate-members, and means for supporting the rack in said position.

9. A combination carrier device for an automobile, comprising two parallel bars adapted to extend rearwardly from the frame of the automobile, a pair of bumper units, each of said units consisting of an attaching plate and a pair of impact members projecting laterally therefrom, plate-members extending between and secured to the attaching plates and the rear ends of the bars, said plate-members being operative to space bumper units rearwardly of said bars and having pads thereon for engaging the front edges of the attaching plates and the rear edges of said bars, a trunk-rack adapted to be positioned so that the rear end thereof overhangs said plate-members, and means for supporting the rack in the aforementioned position.

10. A combination carrier device for an automobile, comprising two parallel bars adapted to extend rearwardly from the frame of the automobile, a pair of bumper units, each of said units consisting of an attaching plate and a pair of vertically spaced impact members connected to and projecting laterally therefrom, plate-members extending between and secured to the attaching plates and the rear ends of the bars, said plate-members being operative to space the bumper units rearwardly of said bars and having pads thereon for engaging the opposite edges of said impact members, a trunk-rack adapted to be positioned so that the rear end thereof overhangs said plate-members, and means for supporting the rack in said aforementioned position.

11. A combination carrier device for an automobile, comprising two parallel bars adapted to be extended rearwardly from the frame of the automobile, a pair of laterally extending bumper units positioned rearwardly of and supported by the rear ends of said bars, a cross-member extending between said units, a horizontal trunk-rack positioned above the rear ends of said bars, means for supporting the rack in said position, and a carrier for a spare tire secured to said rack and cross-member.

Signed at Chicago, Cook County, Illinois, this 9th day of June, 1928.

EDWARD MACH.